United States Patent Office 2,693,814
Patented Nov. 9, 1954

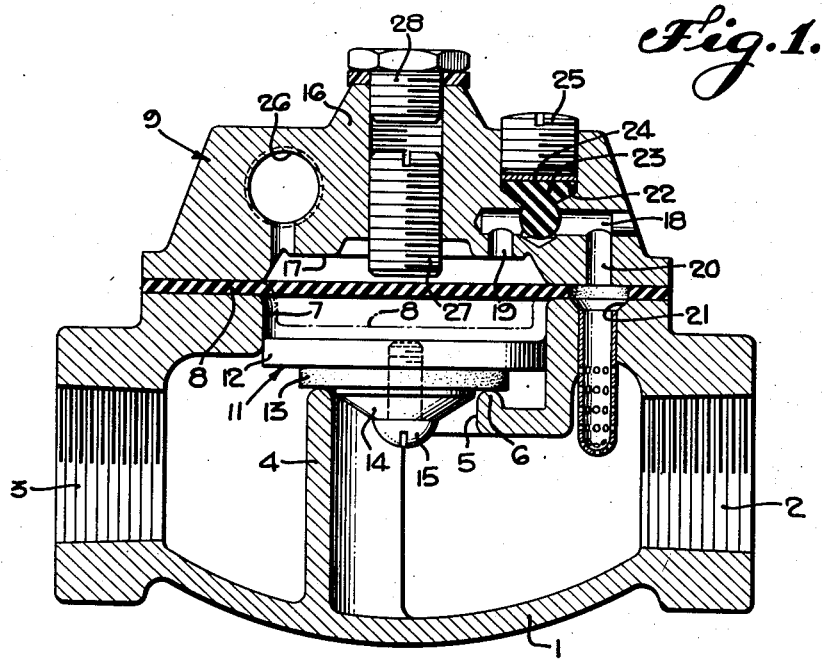

2,693,814

CONVERTIBLE REMOTE CONTROL VALVE

Lorenzo A. Richards, Riverside, Calif.

Application April 17, 1950, Serial No. 156,317

2 Claims. (Cl. 137—270)

My invention relates to remote control valves. The present application is a continuation-in-part of my co-pending application entitled: Method and Apparatus for Irrigating Plants, filed June 24, 1948, Serial No. 34,946, now Patent No. 2,674,490 of April 6, 1954.

Among the objects of my invention are:

First, to provide a remote control valve which is responsive to hydraulic or pneumatic pressure; that is, responsive to fluid flow in a pilot line of small capacity to control fluid flow in a conduit of larger size.

Second, to provide a remote control valve of this class which is particularly simple of construction and is versatile in performance; that is, adapted to various types of installations without change in its construction, as, for example, to be installed so as to be closed by pressure at the upstream side of the valve or by pressure from some extraneous source.

Third, to provide a remote control valve which also functions as a check valve to prevent back flow, so that contaminants from the discharge end of a system controlled by the valve cannot flow back into the source line in the event of a reversal of pressure.

With the above and other objects in view as may appear hereinafter, reference is directed to the accompanying drawings, in which:

Figure 1 is a longitudinal sectional view of my remote control valve taken through 1—1 of Fig. 3, the parts being arranged for response to pressure exerted at the high pressure side of the valve.

Figure 2 is a fragmentary sectional view similar to Fig. 1 showing the parts arranged for response to pressure from some extraneous source.

Figure 3 is a reduced plan view of my valve structure.

My remote control valve includes a body 1 having an inlet 2 and an outlet 3 separated by a partition 4 so arranged as to provide an upwardly directed port 5 bordered by a valve seat 6 located on its outlet side. Above the port and valve seat at the outlet side thereof the body is provided with a coaxial socket forming a valve chamber 7 of substantially larger area than the valve seat 6.

The socket or chamber 7 is surrounded by an annular finished surface which receives a diaphragm gasket 8 over which fits a cover 9, secured to the body 1 by screws 10. The diaphragm gasket 8 covers and forms one wall of the valve chamber 7. Within the valve chamber is a floating valve 11 which includes a disk plunger 12 loosely fitting but guided axially by the side walls of the chamber 7, a valve washer 13 below the disk engageable with the valve seat, a guide and pintle washer 14 below the valve washer, and a screw 15 threaded upwardly through the disk plunger 12 to hold the parts together.

The cover 9 is provided with a central diametrically extending boss 16 and is recessed slightly as indicated by 17 in the region of the valve chamber 7. The cover is bored to form a radial passage 18 and intersecting ports 19 and 20 communicating respectively with the recessed portion 17 and a small port 21 formed in the body 1 and communicating with the inlet 2. A small strainer is secured in the port 21. The radial passage 18 is intersected by a threaded bore 22 reduced at its lower end. The bore 22 receives a distortable rubber plug 23, backed by a washer 24 and screw 25. Thus, by tightening the screw 25 the distortable plug 23 is forced into and throttles the passage 18. There is thus provided a controlled bypass between the inlet or high pressure side of the valve body and the recess 17 above the valve chamber 7.

The cover 9 is also provided with a lateral outlet 26 arranged to receive a pipe fitting and communicating with the recess 17. Also, the cover 9 is provided with a central threaded bore which receives a stop plug 27 and a seal plug 28. The stop plug serves to limit upward movement of the floating valve 11.

Operation of my remote control valve is as follows:

When the valve is arranged as shown in Fig. 1, and installed in a fluid line, pressure in the inlet or high pressure side of the valve is admitted through the strainer and associated ports and passages to the recess 17. If the bleeder outlet 26 or the small line connected therewith is closed, the diaphragm is forced by fluid pressure downwardly, as indicated by broken lines, against the disk plunger 12 holding the floating valve closed by reason of the greater area of the valve chamber as compared to the valve port. If the bleeder outlet or associated line is open and the throttle valve or plug 23 is adjusted to provide a lesser rate of flow into the recess 17 than can be accommodated by the bleeder outlet, then the pressure in the recess 17 is relieved and the line pressure against the floating valve opens the valve to the limit determined by the stop plug 27.

Should it be desired to operate the valve by pressure from an extraneous source, the cover may be shifted to a position other than that shown in Fig. 1; that is to a position as shown in Fig. 2 in which the communication between the recess 17 and the inlet side of the valve is closed. In this case, pressure fluid is introduced through or removed through the bleeder outlet 26 to effect closing and opening of the valve. In this case it will be observed that the flow to and from the outlet 26 involves a fluid volume no greater than necessary to supply the recess 17 and valve chamber; that is, no continued bleeding of fluid is necessary as in the first illustrated arrangement.

It will be observed that the floating valve is, in fact, a check valve operating to prevent back flow between the normal outlet and inlet. Thus, in the event of failure of pressure at the normally high pressure side of the valve, the floating valve prevents back flow of any contaminant which may exist in the system beyond the valve. This is of substantial practical importance in many cases, for example when the remote control valve is employed as a sprinkler control valve in irrigation systems. In such case fertilizer or other deleterious matter is prevented from back flow into the water mains.

Many other embodiments of the invention may be resorted to without departing from the spirit of the invention.

I claim:

1. A remote control valve, comprising: a valve body having an inlet, an outlet, a valve cavity between said inlet and outlet, and a valve seat between said cavity and said outlet, said valve cavity having a cylindrical portion concentric with said valve seat; a floating valve element in said valve cavity for coaction with said valve seat and adapted to permit flow from said inlet to said outlet but prevent back flow therethrough, said valve element including a valve washer for said valve seat and a guide disk slidable in said cylindrical portion; a diaphragm covering said guide disk and valve cavity; a cover member adapted to be fastened in at least two positions on said valve body over said cavity to clamp said diaphragm; said cover member and diaphragm defining a pressure chamber of larger area than said valve seat, said diaphragm being movable in response to pressure in said pressure chamber to force said valve against its valve seat; said cover member defining a first passage from said pressure chamber for connection to an external pressure source, said cover member and body member defining a second passage communicating between said pressure chamber and the valve body inlet when said cover is secured thereto in one position and sealed from such communication when said cover is secured to the body member in its other position.

2. A remote control valve as set forth in claim 1 which further comprises: a restricter valve in said cover member for controlling flow through said second passage; and an adjustable stop in said cover protruding into said pressure chamber to limit travel of said floating valve element.

References Cited in the file of this patent

UNITED STATES PATENTS

| Number | Name | Date |
|---|---|---|
| Re. 11,722 | Gulland | Mar. 14, 1899 |
| 237,854 | Garsed | Feb. 15, 1881 |
| 530,200 | Olson | Dec. 4, 1894 |
| 595,061 | Gulland | Dec. 7, 1897 |
| 1,523,526 | Hedges | Jan. 20, 1925 |
| 1,583,642 | Bailey | May 4, 1926 |
| 2,348,083 | McCabe | May 2, 1944 |
| 2,409,091 | Wright | Oct. 8, 1946 |